(12) United States Patent
Laming et al.

(10) Patent No.: US 6,303,041 B1
(45) Date of Patent: *Oct. 16, 2001

(54) METHOD AND BATH FOR TAPERING OPTICAL FIBERS

(75) Inventors: Richard Ian Laming; Laurence Reekie; Liang Dong, all of Southampton (GB); Jose Luis Cruz, Valencia (ES)

(73) Assignee: Pirelli Cavi e Sistemi S.p.A., Milan (IT)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/481,530

(22) Filed: Jan. 12, 2000

Related U.S. Application Data

(62) Division of application No. 08/894,352, filed as application No. PCT/GB96/00401 on Feb. 22, 1996.

(30) Foreign Application Priority Data

Feb. 22, 1995 (GB) .................................................. 9503555

(51) Int. Cl.[7] .................................................. C05C 25/66
(52) U.S. Cl. .................................. 216/24; 216/90; 216/91
(58) Field of Search .................................. 216/24, 90, 91

(56) References Cited

U.S. PATENT DOCUMENTS

| 4,469,554 | 9/1984 | Turner | 156/657 |
| 5,598,493 | * 1/1997 | Bonham, Jr. et al. | 385/33 |
| 5,897,679 | * 4/1999 | Anderson et al. | 65/382 |
| 5,960,147 | * 9/1999 | Muramatsu et al. | 385/123 |

FOREIGN PATENT DOCUMENTS 2 220 602 A   1/1990  (GB) .

57188007   11/1982  (JP) .

OTHER PUBLICATIONS

EPO Search Report dated May 5, 2000.

M.A. Putnam et al., "Fabrication of tapered, strain–gradent chirped fibre Bragg gratings", Electronics Letters, vol. 31, No. 4, Feb. 16, 1995, pp. 309–310.

K.C. Byron et al., "Fabrication of Chirped Bragg Gratings in Photosensitive Fibre", Electronics Letters, vol. 29, No. 18, Sep. 2, 1993, pp. 1659–1660.

H.M. Marchman et al., "Fabrication of optical fiber probes for nanometer–scale dimensional metrology", Review of Scientific Instruments, vol. 65, No. 8, Aug. 1994, pp. 2538–2541.

* cited by examiner

Primary Examiner—Randy Gulakowski
Assistant Examiner—Allan Olsen
(74) Attorney, Agent, or Firm—Finnegan, Henderson, Farabow, Garrett & Dunner, L.L.P.

(57) ABSTRACT

PURPOSE: To increase the mechanical strength of a connected optical fiber, by carrying out a surface treatment by dipping the melt-struck connection part of the optical fiber in a treating liquid of strong acid and then in a treating liquid of hydrofluoric acid.

CONSTITUTION: A treatment liquid 6 of a mixture solution consisting of 1 or ≧2 kinds of strong acid such as sulfuric acid, hydrochloric acid, nitric acid, etc. is stored in a liquid tank 7. A melt-stuck connection part 5 of end parts 2A and 2B of optical fibers 1A and 1B is dipped in the tank 7. Thus coat residue, dust, metallic particles, etc. sticking to the surface of the part 5 are removed. Then the part 5 is dipped in a treating liquid containing an aqueous solution of hydrofluoric acid, ammonium fluoride, sodium fluoride in a liquid tank 8. Thus the minute flaws on the surface are removed or annealed. As a result, the strength is increased at the part 5.

8 Claims, 7 Drawing Sheets

Method A — during writing after writing

Method B ns along the length of the grating. Good controllability has been demonstrated
METHOD AND BATH FOR TAPERING OPTICAL FIBERS This is a division of application Ser. No. 08/894,352, filed Oct. 22, 1997, and claims the benefit of International application no. PCT/GB96/00401, filed Feb. 22, 1996.

This invention relates to chirped optical fibre gratings.

Optical fibre Bragg gratings are periodic index modulations impressed either in the cladding of an optical fibre (the low refractive index region to confine light) or the core of an optical fibre (the high refractive index region to guide light) or both. In order to imprint the grating, a suitable fibre usually has a photosensitive core, a photosensitive cladding, or both. A glass is photosensitive when its refractive index can be modified (usually, for these purposes, permanently) by optical radiation.

In silica based optical fibres, a core can be made photosensitive simply by incorporating certain amount of germanium, which also has the desired effect of raising the core refractive index to form a waveguide. The silica based cladding is normally transparent to the writing beams, giving easy access to the core from the side of the fibre.

In previous examples of this technique where only the core of a fibre is photosensitive, one imprinting technique involves exposing the side of the fibre to two coherent interfering optical beams. The grating pitch is constant along the length of the grating and can be adjusted conveniently by changing the angle between the two beams. The "writing" beam in this case can be optical radiation at a wavelength of about 240 nm (nanometers). Using a photosensitive fibre core provides a large spatial overlap between the index modulation and the guided optical transmission mode, since a large part of the optical power propagates in the core.

Another previously proposed method for writing fibre gratings is a technique using a phase mask. A phase mask is a silica plate with many parallel periodic grooves written on it, and an image of the periodic pattern is reproduced in the space behind the phase mask when optical radiation is directed onto the phase mask. A photosensitive fibre can be placed behind the phase mask for gratings to be imprinted in the photosensitive region of the fibre.

A significant feature of a non-chirped fibre grating is that it only reflects light at a certain resonant wavelength (Bragg wavelength) characteristic of the grating pitch. As a narrow band device, it has many applications such as reflectors for fibre lasers (particularly for single frequency fibre lasers), as band-stop filters, as band-pass filters, or in fibre sensors.

"Chirped" gratings are gratings for which the Bragg wavelength varies along the length of the grating. A chirped grating reflects light of different wavelengths at different positions along its length. This strong dispersive feature can be used to compensate for dispersion in an optical fibre link (publication references 1 and 2, below) and for optical pulse shaping. Chirped gratings can also be used as broad band reflectors in fibre and semiconductor lasers.

There are two main ways to make chirped gratings: these are (i) "post-chirping" a uniform grating, and (ii) introducing a chirp during grating writing.

As the Bragg wavelength($\lambda_g$) is given by $\lambda_g = 2n_{eff}\Lambda$, where $n_{eff}$ is the effective refractive index of the propagating optical mode and $\Lambda$ is the grating pitch, a grating can therefore be chirped by varying either the effective modal index or the grating pitch along its length.

In order to introduce a chirp into a grating while writing, there are several techniques which have been demonstrated, such as varying the effective modal index along the grating using a second exposure (reference 1, below), varying the grating pitch along the grating by bending the fibre (reference 3, below), varying the effective modal index along the grating by tapering the fibre core (reference 4, below), varying the grating pitch along the grating by using a chirped phase mask (reference 5, below), and varying the grating pitch along the grating by focusing the two interfering beams differently (reference 6, below). However, there are usually many difficulties in obtaining a controllable chirp apart from the technique using a chirped phase mask (reference 5, below), which in turn lacks flexibility.

A temperature (reference 7, below) or a strain gradient (reference 8, below) can be applied to post-chirp a uniform grating. The temperature or strain gradient varies both the effective modal index and the grating pitch along the length of the gratings. Good controllability has been demonstrated with a temperature gradient (reference 7, below), but a high temperature is required to obtain a large chirp ($\Delta\lambda_g/\lambda_g = 8.86 \times 10^{-6} \Delta T$, where $\Delta T$ is a change in temperature in degrees Celsius (° C.), so a 1 nm chirp at a wavelength of 1.55 $\mu$m (micrometer) requires a $\Delta T$ of about 70° C.) and it is very difficult to obtain chirp profiles other than a linear chirp (i.e. a linear relationship between reflected wavelength and position along the grating). A good strain-chirped grating has been demonstrated with a cantilever arrangement to apply the strain gradient (reference 2, below), but the method is potentially polarisation sensitive due to the bend-induced birefringence. It is also difficult to produce a chirp other than a linear chirp and to package the chirped grating.

The article, "Fabrication of optical fibre probes for nanometer-scale dimensional metrology", Review of Scientific Instruments, August 1994, Vol. 65, No. 8, pp 2538–2541 (H M Marchman et al) discloses an optical fibre etching bath comprising a beaker filled with etchant liquid.

This invention provides a method of manufacturing a chirped optical fibre grating, the method comprising the steps of:
 etching the cladding of the optical fibre to vary the cross-sectional area of a portion of an optical fibre; and
 impressing a grating of uniform pitch on the portion of the fibre;
 in which the portion of the fibre is subjected to different respective longitudinal forces during the impressing step and during subsequent use of the grating.

In a method according to embodiments of the invention, a taper in the fibre cladding is produced by an etching process which in contrast to fusion tapering processes, leaves the fibre core relatively unaffected. A uniform grating is then impressed on the fibre core, under one of two force regimes:
 (i) the grating is impressed while the fibre is subjected to a temporary force which is subsequently relaxed; or
 (ii) the grating is impressed without a force applied to the fibre; a longitudinal force is then applied to the fibre in use.

In either case, the variation of local stress resulting from a uniform force is dependent upon the local cross-sectional area of the fibre (including cladding), so stress-related chirp can be induced by either of these methods without requiring a strain gradient to be externally imposed along the fibre.

The method is flexible, in that the grating properties can be varied by varying the fibre pre-tension, the fibre post-tension or the fibre taper profile, and yet controllability is not sacrificed. The method does not rely on techniques (such as cantilever bending) which can make the resultant grating polarisation-sensitive.

A larger range of chirp characteristics can be obtained using this method, without needing any active control in the resulting device.

In one embodiment, the portion of the fibre is subjected to a greater longitudinal force during the impressing step than during subsequent use of the grating. In particular, it is preferred that the portion of the fibre is subjected to a substantially zero longitudinal force during subsequent use of the grating. This can lead to a strongly chirped grating since a possible conflict between a stress-induced chirp and a fibre lengthening induced chirp is avoided (because the fibre, in use, is not under stress). The grating can also be packaged in a substantially stress-free state. Although the applied longitudinal force could be a compression force, it is preferred that the portion of the fibre is subjected to a longitudinally stretching force at least during the impressing step.

In another embodiment, the portion of the fibre is subjected to a lower longitudinal force during the impressing step than during subsequent use of the grating. In particular, it is preferred that the portion of the fibre is subjected to a substantially zero longitudinal force during the impressing step. Again, although the force applied during subsequent use of the grating could be a compression force, it is preferred that the portion of the fibre is subjected to a longitudinally stretching force at least during subsequent use of the grating.

Although the non-linearly chirped gratings could be manufactured by using an appropriate fibre cross-sectional area profile, in order to produce a linearly chirped grating it is preferred that the etched portion of the optical fibre has a substantially linear variation in the inverse of cross-sectional area with distance along the fibre.

Preferably the etching step comprises the steps of:

suspending the fibre in an etching bath having a layer of cladding etchant suspended between two non-etching liquid layers; and causing relative movement between the fibre and the etching bath so that the layer of cladding etchant moves longitudinally along the fibre with time.

Although uncoated fibre could be used, in case the fibre has a coating it is preferred that the method comprises the step of: before the suspending step, removing a coating from at least the portion of the fibre.

Various etchant are envisaged, but in a preferred embodiment the cladding etchant comprises an aqueous solution of hydrofluoric acid.

Preferably at least one of the non-etching liquid layers comprises decahydronaphthalene with about 10% dichlorotoluene, and/or at least one of the non-etching liquid layers comprises trichloroethylene.

The thickness of the etching layer is in some ways a compromise between etching speed and etching resolution. Too thin a layer can lead to very long etching times and also poor etching accuracy because boundary mixing with the other layers can become significant. In alternative preferred embodiments, the layer of cladding etchant is between about 3 millimeters and about 10 millimeters thick or the thickness of the layer of cladding etchant is greater than the length of the portion of the fibre (e.g. about 40 millimeters thick for a 25 mm portion).

In order to allow a grating to be matched to the precise characteristics of, for example, a particular communication system, it is preferred that the longitudinal force applied to the portion is variable during subsequent use of the grating, to tune the response of the grating.

This invention also provides a method of manufacturing a chirped optical fibre grating, the method comprising the steps of: etching the cladding of the optical fibre to vary the cross-sectional area of a portion of an optical fibre; subjecting the portion of the optical fibre to a non-zero longitudinal force; impressing a grating of uniform pitch on the portion of the optical fibre; and relaxing the longitudinal force.

This invention also provides am method of manufacturing a chirped optical fibre grating, the method comprising the steps of: etching the cladding of the optical fibre to vary the cross-sectional area of a portion of an optical fibre; impressing a grating of uniform pitch on the portion of the fibre; and subjecting the portion of the optical fibre to a non-zero longitudinal force.

This invention also provides a method of manufacturing a chirped optical fibre grating (and a fibre manufactured according to that method), the method comprising the steps of: etching the cladding of the optical fibre to vary the cross-sectional area of a portion of an optical fibre; subjecting the portion of the optical fibre to a non-zero longitudinal force; and impressing a grating of uniform pitch on the portion of the optical fibre. In this case, the longitudinal force could be maintained during subsequent use of the grating.

This invention also provides a method of tapering a portion of an optical fibre, the method comprising the steps of:

suspending the fibre in an etching bath having a layer of cladding etchant suspended between two non-etching liquid layers; and causing relative movement between the fibre and the etching bath so that the layer of cladding etchant moves longitudinally along the fibre with time.

This invention also provides a chirped optical fibre grating formed in a portion of an optical fibre, characterised in that the portion of the optical fibre has an etched cladding to vary the cross-sectional area of the portion of the optical fibre; in which, in use, the portion of the fibre is subjected to a different respective longitudinal force to that applied when a grating was impressed on the portion of the optical fibre.

This invention also provides a chirped optical fibre grating formed in a portion of an optical fibre, characterised in that the portion of the optical fibre has an etched cladding to vary the cross-sectional area of the portion of the optical fibre; and the grating comprises means for subjecting the portion of the optical fibre to a non-zero longitudinal force different to a longitudinal force applied when a grating was impressed on the portion of the optical fibre.

This invention also provides an optical transmission link comprising: an optical fibre transmission medium; and a chirped optical fibre grating as defined above, coupled to the optical fibre transmission medium to compensate against the dispersion of the transmission medium.

This invention also provides an optical communication system comprising:

an optical transmitter;

an optical receiver;

an optical fibre transmission medium linking the optical transmitter and the optical receiver; and a chirped optical fibre grating as defined above, coupled to the optical fibre transmission medium to compensate against the dispersion of the transmission medium.

This invention also provides an optical fibre etching bath comprising a layer of optical fibre cladding etchant suspended between two non-etching liquid layers.

Preferred features of the various aspects of the invention defined above apply equally to other aspects of the invention.

The invention will now be described by way of example with reference to the accompanying drawings, throughout which like parts are referred to by like references, and in which:

FIG. 1 is a schematic diagram of an etching bath;

FIGS. 2a to 2d schematically illustrate two techniques for writing gratings using a fibre which has been tapered using the etching bath of FIG. 1;

FIG. 3 schematically illustrates a number of possible fibre profiles to achieve a linearly chirped fibre grating;

Figure 10:
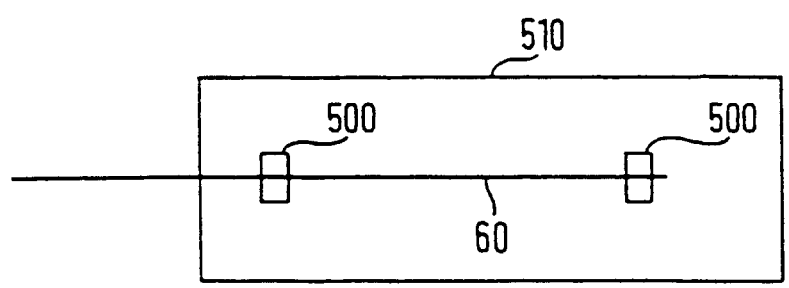

FIG. 10 schematically illustrates a package for holding a fibre grating under tension.

In the embodiments described below, a taper is produced on the outer cladding of an optical fibre by differential etching along the length of the fibre. The fibre core is substantially unaffected by the process. This taper is etched by controlling the movement of a fibre through a bath of hydrofluoric acid (HF). A grating can then be written over the taper in the usual manner with either zero or some pre-tension on the fibre. These alternatives will be referred to as "method A" and "method B".

Method A

When there is no pre-tension on the fibre during writing (this method being referred to below as method A), the grating is not chirped in its as-written state, but becomes chirped when a force is subsequently applied to the fibre. This is because the force creates a strain gradient over the taper (since the local strain depends on the fibre diameter), which in turn causes a refractive index gradient over the taper through the so-called "stress-optic" effect. Also, the grating pitch is made to vary along the tapered portion through a straightforward fibre lengthening effect (the stretching of the fibre depending on the local diameter).

In fact a slight applied tension might be required to hold the fibre straight and still during the grating exposure, but any such slight tension is not significant to the grating properties and is treated here as a substantially zero force.

Method B

In method B, a force is applied to the tapered fibre during the writing of the grating, and is then subsequently released.

When the force is applied to the fibre during writing, the grating is chirped because of the strain gradient along the fibre. This chirp is from the refractive index variation caused by the strain gradient (the stress optic effect). The grating pitch, however, does not vary over the taper in this case.

The grating could be used in this (tensioned) form. However, if the force is subsequently removed, the chirp due to the stress-optic effect disappears with the strain gradient, but another chirp is developed as different parts of the taper relax differently from the initial strain gradient (this is in fact the reverse of the lengthening effect).

As described above in connection with method A, in fact a slight applied tension might be required to hold the fibre straight and still when it is ultimately packaged for use. However, any such slight tension is not significant to the grating properties and is treated here as a substantially zero force.

Figure 1:
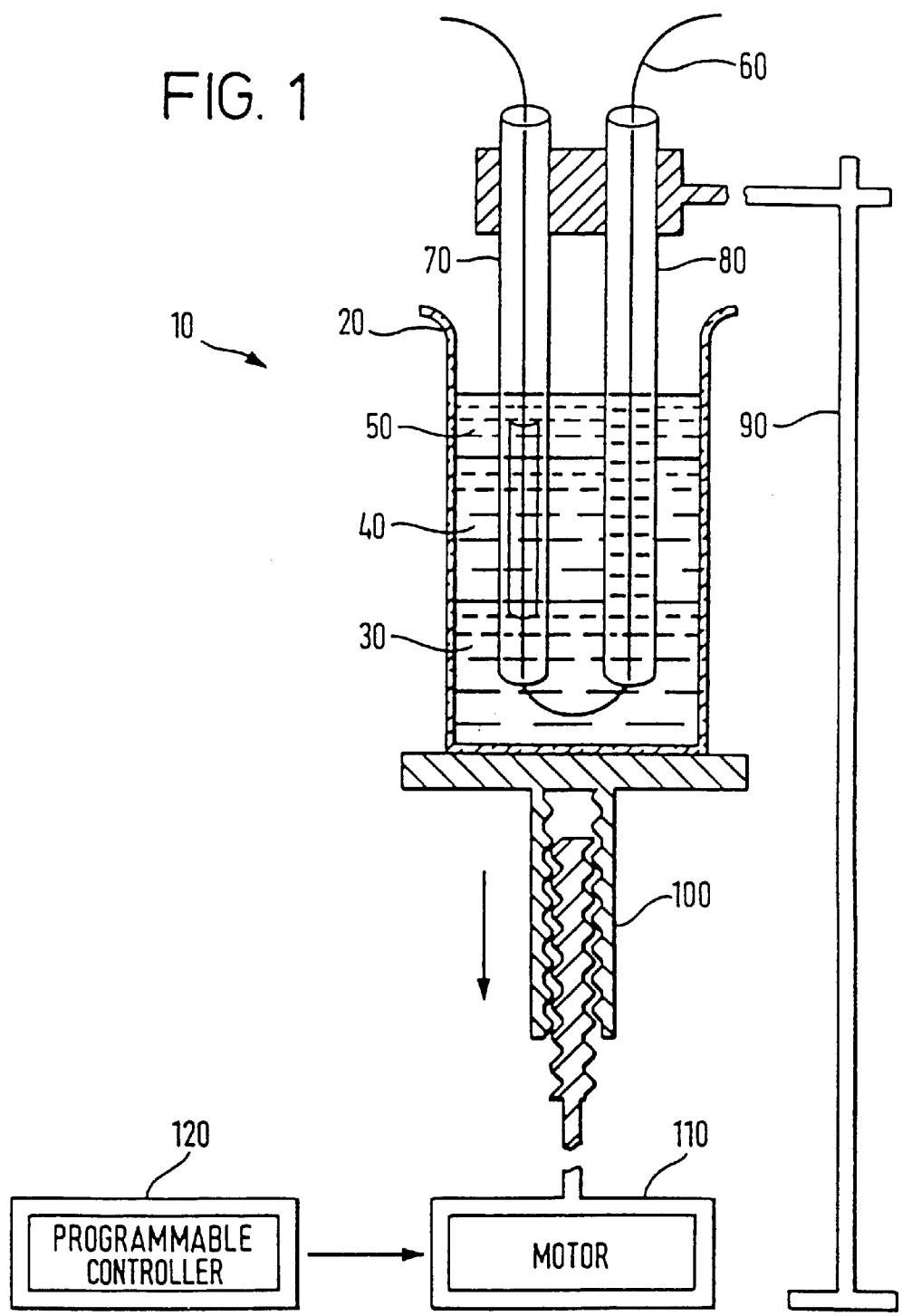

Referring now to FIG. 1, an etching bath 10 comprises a beaker 20 containing a layer 30 of trichloroethylene, a layer 40 of aqueous hydrofluoric acid (32%) and a layer 50 of decahydronaphthalene with 10% dichlorotoluene. A photosensitive optical fibre 60 to be etched is guided through the three layers 30, 40, 50 by glass tubes 70, 80, supported on a retort stand 90. The beaker 20 is supported by a platform which can be moved vertically by a threaded connection 100 driven by a high accuracy motor (such as a stepper motor) 110, under the control of a programmable motor controller 120.

Two alternative approaches are possible for selecting a suitable thickness of the layer 40. In one approach, the layer 40 is preferably between about 3 mm and 10 mm thick. This relatively thin layer provides high etching resolution and allows etched profiles in which the fibre diameter does not monotonically increase or decrease to be prepared. In an alternative approach, the layer 40 can be made thicker than the actual taper length required, and the fibre can then be slowly withdrawn from the layer 40. In this case, the layer 40 could be about, say, 40 mm thick for a taper length of, say, 25 mm.

Before the fibre is etched, any coating which has previously been applied to the fibre is removed. Such coatings are generally polymer, acrylate or plastics materials and can be removed using well established techniques such as scraping the fibre or softening the coating using a solvent such as a 50:50 mixture of dichloromethane and acetone. The softened coating can then be removed by firmly wiping along the length of the fibre. Alternatively of course, the fibre could be etched before the initial coating process is carried out.

The etching bath 10 is used to produce a taper of a desired profile in the outer cladding of the fibre 60. The taper is made by immersing the fibre in the etching bath and then moving the beaker 20 up or down at a controlled rate. Etching occurs only in the HF layer 40; the other two layers 30, 50 are merely relatively inert buffer oils having appropriate higher and lower densities to contain the hydrofluoric acid layer 40 and to provide good fibre diameter control at the two ends of a taper. The etching rate is linear with time so, subject to the selection of the thickness (height) of the HF etching layer 40 (described above), any desired taper profile can be produced by controlling the vertical movement of the beaker 20.

In the present techniques, the cladding of the fibre is etched away to form the taper. In contrast to fusion tapering techniques, where the fibre is heated and stretched to produce a taper, the core of the fibre is substantially unaffected by the process shown in FIG. 1.

A batch of fibres having the same taper profile can be etched at the same time using the etching bath of FIG. 1. The exemplary 32% HF solution reduces fibre diameter at about 1.07 $\mu$m per minute at room temperature (17.5° C.), so a taper with a large and small end diameters of 125 $\mu$m and 60 $\mu$m respectively takes about 1 hour to make. Less time would be required if a stronger HF solution or higher solution temperature were used.

Once a taper has been made, two different methods can be used to make chirped gratings. As mentioned above, these are referred to in this description as method A and method B.

Figure 2A:
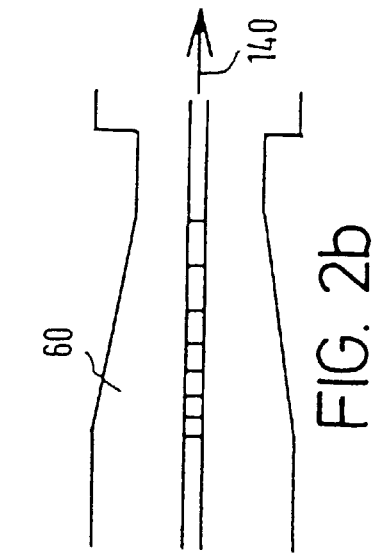
Figure 2B:
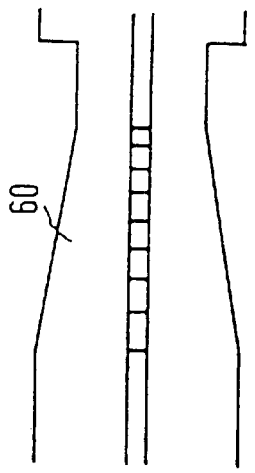

FIGS. 2a and 2b are schematic illustrations of the process steps of method A. In method A, a uniform grating 130 is written over the tapered portion of the fibre 60 by either of the two techniques described above, and without a significant pre-tensioning force being applied to the fibre. The fibre 60 is then subjected (in use) to a longitudinal tension 140, so that a strain gradient is developed along the grating due to the fact that the local strain depends on fibre cross-sectional area. This can be achieved, for example, by packaging the grating in a clamp device such as that illustrated schematically in FIG. 10. Here, the fibre 60 is clamped by clamps 500 to a substrate 510, while under a longitudinal tension. (Alternatively of course the grating could be encapsulated in a material which holds the fibre in a tensioned state, or could be clamped to a substrate along a length of the fibre. The substrate could even be a PZT element to provide a variable tension to tune the grating). The grating becomes chirped because the strain gradient causes both the effective modal index and grating pitch to vary along its length.

In this technique, if the longitudinal force 140 applied to the fibre is F, the local change of Bragg wavelength $\Delta\lambda_g$ at a fibre radius r will be:

$$\frac{\Delta\lambda_g}{\lambda_g} = \frac{F}{\pi E r^2} - \chi \frac{F}{\pi E r^2} \qquad (1)$$

where E is Young's modulus, and $\chi=0.22$ for silica. The first term arises from the change of grating pitch (fibre lengthening effect) and the second term from the change of refractive index from the stress-optic effect. The stress-optic effect cancels out part of the chirp from the fibre lengthening effect since they have opposite signs.

Figure 2C:
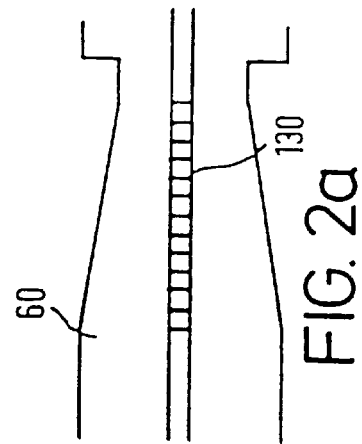
Figure 2D:
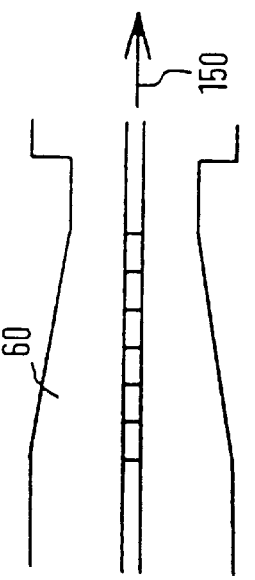

FIGS. 2c and 2d are schematic illustrations of the process steps involved in method B. Here, a grating of uniform pitch is written over the tapered portion of the fibre 60 while the fibre is subjected to a longitudinal pre-tension 150. While the longitudinal tension is maintained, the resulting grating is chirped due to the refractive index gradient along the length of the taper, which in turn arises from the strain gradient.

When the pre-tension on the fibre is removed after writing, the strain gradient disappears. This removes the chirp which had been present due to the index gradient. Another chirp is, however, developed when the pre-tension is removed. This arises because the grating pitch is no longer uniform, as the fibre relaxes non-uniformly with removal of the strain gradient. The resulting grating is therefore chirped without requiring the presence of a longitudinal force, and so the device can then be packaged without a static longitudinal force (i.e. "force-free").

The stress-optic effect does not play any part in the final device in this method, so only the first term in equation 1 remains. The overall chirp is thus larger than that in method A for the same applied force.

In method B, the chirped grating can be packaged force-free. It also creates a larger chirp in method B than in method A for the same applied force, because the stress optic effect in method A has an opposite sign to the lengthening effect and cancels out part of the lengthening effect.

In order to produce a linearly chirped grating, a linear dependence of the inverse of fibre cross-sectional area with distance is required:

$$\frac{1}{r^2(z)} = \frac{1}{l}\left(\frac{1}{r^2(l)} - \frac{1}{r^2(0)}\right)z + \frac{1}{r^2(0)} \qquad (2)$$

here, l is the taper length, and r(z) is fibre radius at axial position z.

Figures 3, 4:
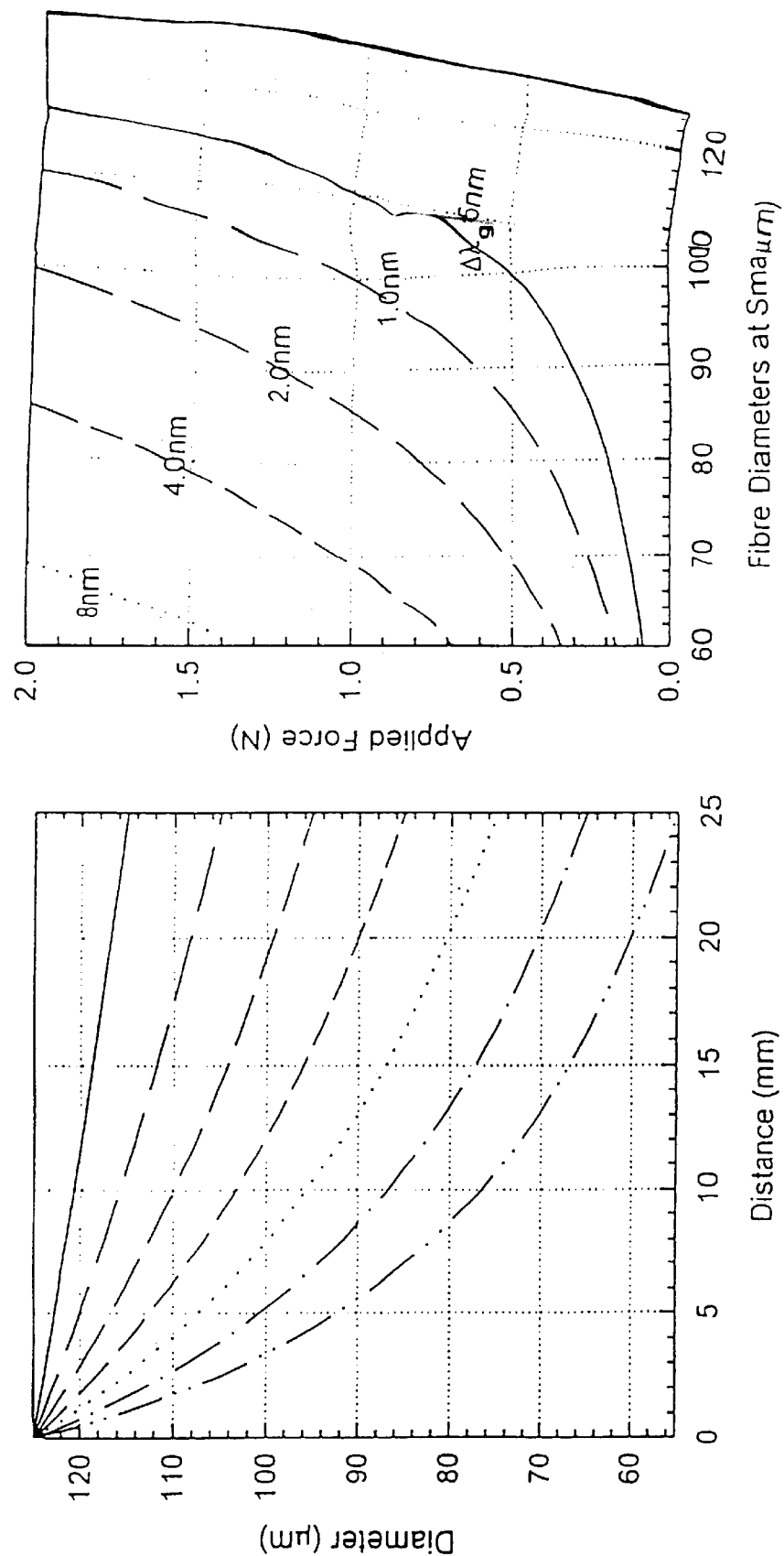
FIG. 4 is a schematic graph showing the applied force during writing and taper required to achieve particular chirp characteristics after relaxation of the force (in this and the other schematic graphs described below, the chirp characteristics are illustrated for a centre wavelength ($\lambda$hd 0) of 1.55 $\mu$m)

FIG. 3 is a schematic graph illustrating some possible taper profiles for producing a linearly chirped fibre grating.

If the "total chirp" is defined as the Bragg wavelength difference at the two ends of a chirped grating, for method A, the total chirp is given by:

$$\text{Total chirp} = \frac{(1-\chi)F\lambda_0}{\pi E}\left(\frac{1}{r^2(l)} - \frac{1}{r^2(0)}\right) \qquad (3)$$

where $\lambda_0$ is the central wavelength of the chirped gratings.

To obtain an expression for the total chirp for method B, it is necessary simply to set $\chi=0$ in equation 3.

A larger difference between r(0) and r(1) is required to achieve a larger chirp for the same amount of applied force. For r(0)=125 $\mu$m, the required F and r(1) for method B to achieve particular total chirp values of 8 nm, 4 nm, 2 nm, 1 nm and 0.5 nm are plotted in FIG. 4.

As the applied force changes, both the total chirp and the central reflection wavelength will be changed. This effect can be used to tune the device. Fibres can normally take several percent of longitudinal force-induced extension. The force to achieve 1% extension in a 60 $\mu$m fibre is about 2 Newtons; A 5 nm chirp is, therefore, easily achievable.

Taper profiles for non-linearly chirped gratings (such as quadratically chirped gratings) are also possible using the techniques described above.

Figure 5:
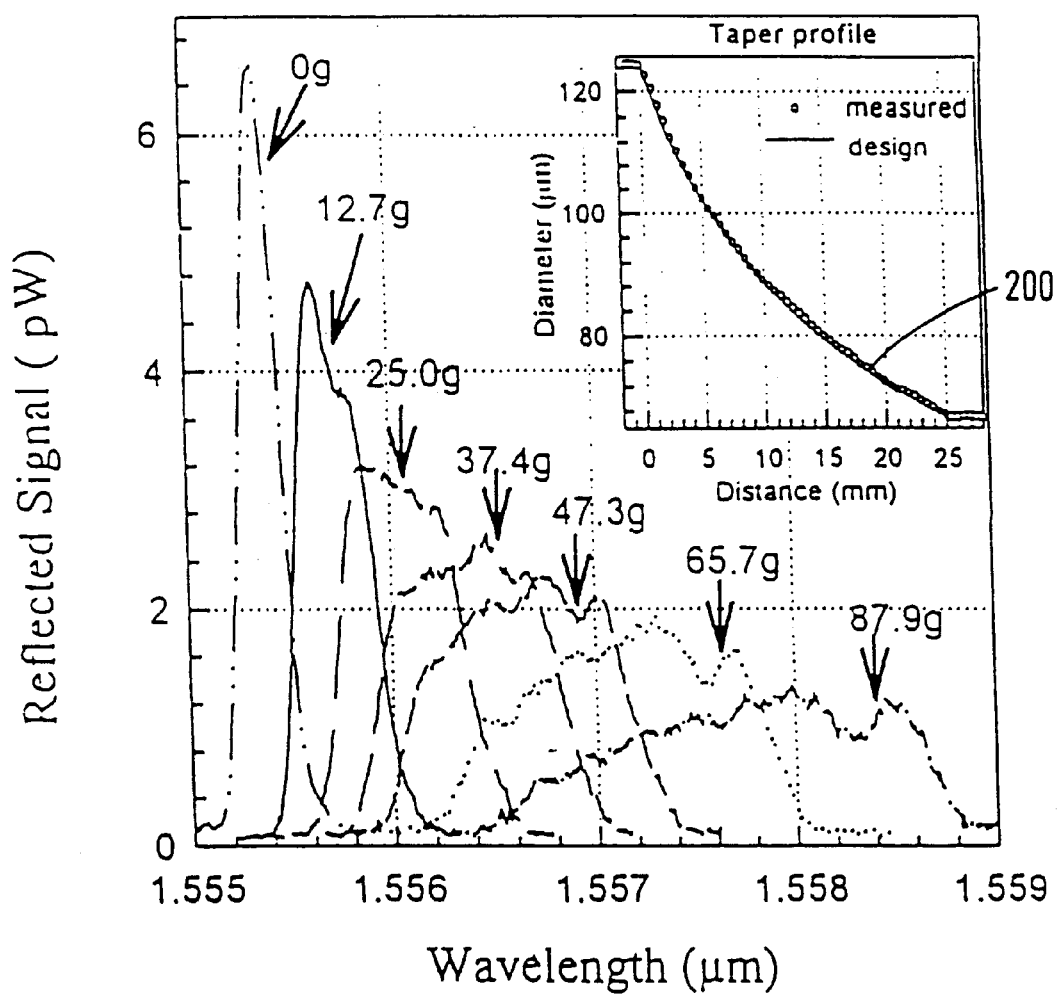
FIG. 5 is a schematic graph illustrating experimental results achieved using a post-stretching technique.
Figure 6:
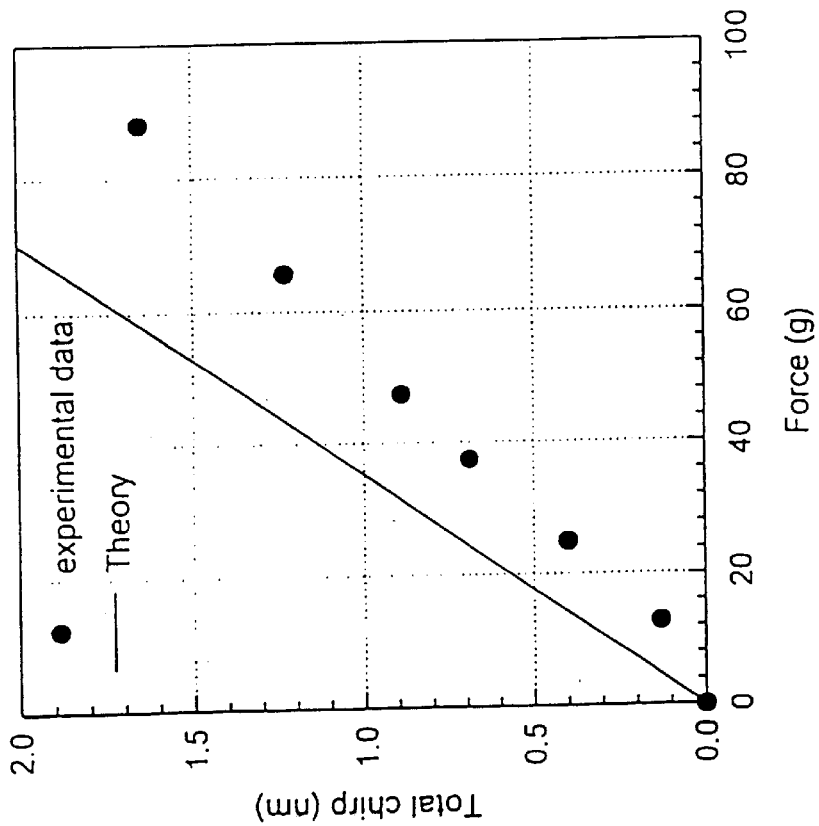
FIG. 6 is a schematic graph illustrating the total chirp of a post-stretched grating against applied tension.

FIG. 5 is a schematic graph illustrating experimental results achieved using a post-stretching technique (method A), and FIG. 6 is a schematic graph illustrating the total chirp of such a post-stretched grating against applied longitudinal force.

In FIG. 5, the spectra of reflected optical signals are plotted for applied longitudinal forces of 0 g (gramme-force), 12.7 g, 25.0 g, 37.4 g, 47.3 g, 65.7 g, and 87.9 g, where 1 g is about $9.81\times10^{-3}$ Newtons. These spectra were obtained with a fibre tapered over a 25 mm length with a taper profile 200 as shown in the insert of FIG. 5. The grating was applied using a phase mask to a 21 mm length of fibre within the tapered region.

FIG. 6 illustrates the total chirp (in nm) obtained for the seven values of applied force listed above. The theoretical relationship between applied force and total chirp is also plotted. The measured chirp shows the predicted linear dependence on loads, but is about 30% less than what is predicted from the theory described above. However, the graph of FIG. 6 can be used to derive the particular values required to obtain a desired chirp characteristic.

The insert to FIG. 5 demonstrates that the etching process can have good controllability to achieve a desired taper profile. In the experiments performed to obtain FIGS. 5 and 6, batches of 6 to 8 tapers were made at the same time. Good repeatability and consistency were found. The taper 200 took about 50 minutes to make with a 32% HF solution.

Figure 7:
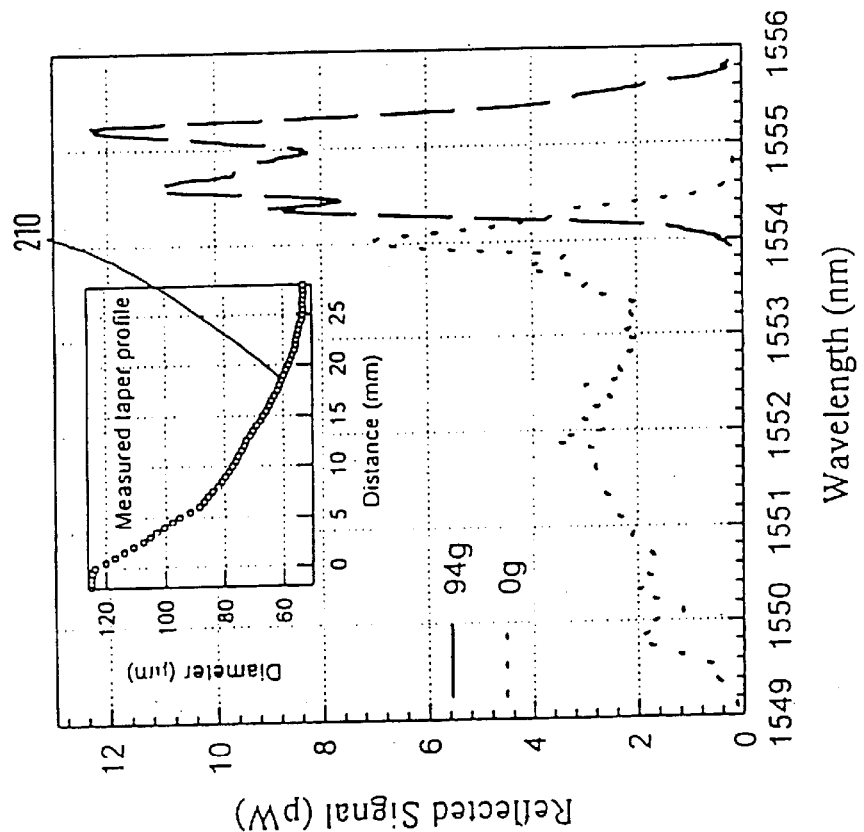
FIG. 7 is a schematic graph illustrating experimental results achieved using a pre-stretching technique.
Figure 8:
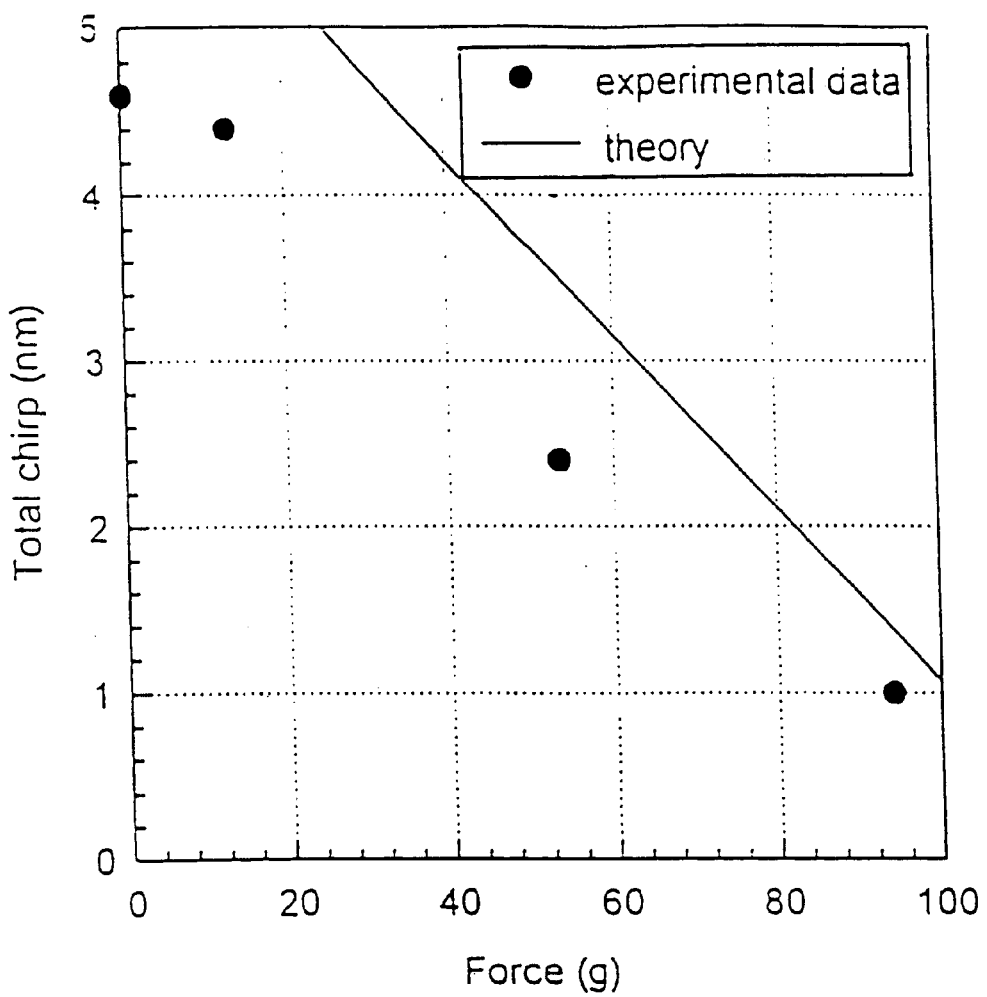
FIG. 8 is a schematic graph illustrating the total chirp of a pre-stretched grating against applied tension.

FIG. 7 is a schematic graph illustrating experimental results achieved using a pre-stretching technique (method B), and FIG. 8 is a schematic graph illustrating the total chirp of such a pre-stretched grating against applied force. The force values used in FIGS. 7 and 8 are 0 g and 94 g. The taper profile 210 used is shown in the insert to FIG. 7. Once again, the grating used is about 21 mm long within a 25 mm taper.

The theoretical prediction of total chirp against applied force is represented by the solid line in FIG. 8 and is again about 30% more than the measured value. The difference may arise from unrealistic values used for the fibre's Young's modulus in the predictions, as the doped silica in the optical fibre may have a different value of Young's modulus to undoped silica.

Figure 9:
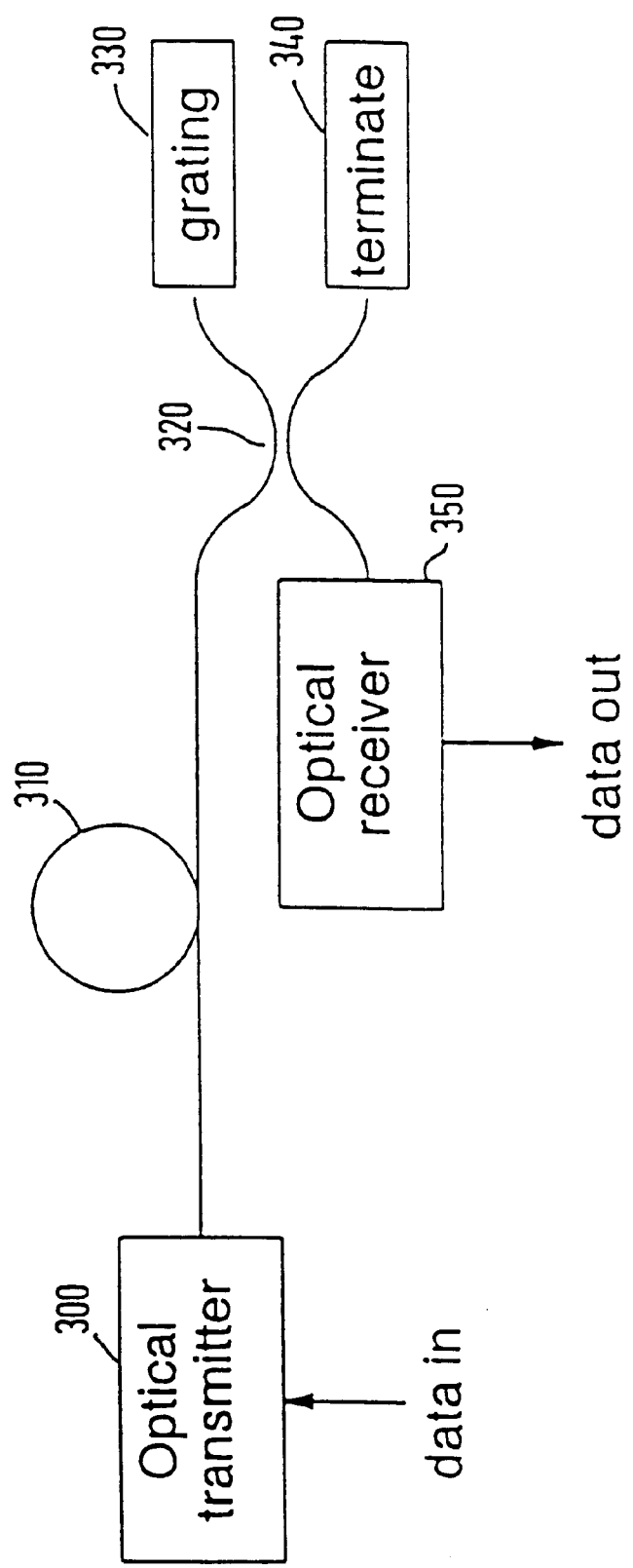
FIG. 9 illustrates an optical communication system using a chirped grating.

FIG. 9 illustrates an optical communication system to demonstrate one possible use of a chirped fibre grating.

In FIG. 9 an optical transmitter 300, which may comprise a laser, means for directly or indirectly modulating the laser output, and an optical amplifier, generates a modulated optical signal in dependence upon input electrical data signals. The optical output signal is passed along a length of optical fibre 310 which exhibits a characteristic dispersion. A 3 dB (decibel) fibre coupler 320 receives the optical signal from the fibre 310, and has a chirped grating 330 and a termination 340 at two of its ports, with an optical receiver and demodulator 350 at the other port. The receiver and demodulator 350 generates an output electrical data signal in dependence on the optical signal it receives from the 3 dB coupler.

As described in reference 2 below, the chirped grating can wholly or partially compensate for the dispersion of the optical fibre 310.

The grating could also be incorporated into an optical fibre transmission link for use with an optical transmitter and receiver. Such a link would comprise the grating coupled (e.g. by the 3 dB coupler 320) to the length of optical fibre 310.

The embodiments described above relate to a pre- or post-stretching force being applied to the tapered fibre. However, the techniques are equally applicable to a compression force being applied to the fibre. For example, the fibre could be tapered using the techniques described above and then impressed with a grating with substantially no longitudinal force, and subsequently the fibre could be compressed using one of the stepper-motor techniques described in reference 9 below. (That reference notes that compression can be advantageous because silica is 23 times stronger under compression than under tension.) Alternatively, the stepper-motor apparatus could be used to compress the fibre during the impressing of the grating, in analogy to method B described above. In a further alternative arrangement, a fibre could be etched and a grating impressed in accordance with method A, with the resulting fibre being embedded in a molten plastics or glass substrate which contracts as it solidifies, longitudinally compressing the fibre grating.

Finally, it is noted that although the examples described above deal mainly with force regimes where either the force during writing or the force during subsequent use of the fibre is substantially zero, the techniques are equally applicable when the longitudinal forces applied during these two stages are merely different (i.e. neither force is substantially zero). For example, a grating made using method A could then be tuned by applying a variable (different but non-zero) longitudinal force during subsequent use of the grating.

PUBLICATION REFERENCES

1. K. O. Hill, F. Bilodeau, B. Malo, S. Theriault, D. C. Johnson and J. Albert: "Chirped in-fibre Bragg gratings for compensation of optical-fibre dispersion", Optics Letters, 19, pp.1314–1316, 1994.

2. D. Garethe, W. S. Lee, R. E. Epworth, T. Brichers, and C. P. Chew: "Practical dispersion equaliser based on fibre gratings with a bit rate length product of 1.6 Tbits/s.Km", ECOC'94, PD paper, p.11.

3. K. Sugden, I. Bennion, A. Molony and N. J. Cooper: "Chirped gratings produced in photosensitive optical fibres by fibre deformation during exposure", Electronics Letters, 30(5), pp.440–442, 1994.

4. K. C. Byron, K. Sugden, T. Bricheno and I. Bennion: "Fabrication of chirped Bragg gratings in photosensitive fibre", Electronics Letters, 29, pp.1659–1670, 1993.

5. R. Kashyap, P. F. McKee, R. J. Campbell and D. L. Williams: "Novel method of producing all fibre photoinduced chirped gratings", Electronics Letters, 30(12), pp.996–998, 1994.

6. M. C. Farries, K. Sudgen, D. C. J. Reid, I. Bennion, A. Molony and M. J. Goodwin: "Very broad reflection bandwidth (44 nm) chirped fibre gratings and narrow bandpass filters produced by the use of an amplitude mask", Electronics Letters, 30, pp.891–892, 1994.

7. J. Lauzon, S. Thibault, J. Martin and F. Quellette: "Implementation and characterisation of fibre Bragg gratings linearly chirped by a temperature gradient", Optics Letters, 19, pp.2027–2029, 1994.

8. P. C. Hill and B. J. Eggleton: "Strain gradient chirp of fibre Bragg gratings", Electronics Letters, 30(14), pp.1172–1174, 1994.

9. G. A. Ball and W. W. Morey: "Compression-tuned single-frequency Bragg grating fibre laser", Optics Letters, 23(19), pp.1979–1981, 1994.

What is claimed is:

1. A method of tapering a portion of an optical fiber using an etching bath, the method comprising the steps of:
   suspending the fiber in an etching bath having a layer of cladding etchant suspended between two non-etching liquid layers; and
   causing relative movement between the fiber and the etching bath so that the layer of cladding etchant moves longitudinally along the fiber with time.

2. The method of claim 1, further comprising removing a coating from at least said portion of the optical fiber before said step of suspending.

3. The method of claim 1, wherein the cladding etchant comprises an aqueous solution of hydrofluoric acid.

4. The method of claim 1, wherein at least one of the two non-etching liquid layers comprises decahydronapthalene with about 10% dichlorotoluene.

5. The method of claim 1, wherein at least one of the two non-etching liquid layers comprises trichloroethylene.

6. The method of claim 1, wherein the layer of cladding etchant is between 3 millimeters and 10 millimeters thick.

7. The method of claim 1, wherein the layer of cladding etchant has a thickness that is greater than said portion of the optical fiber in length.

8. An optical fiber etching bath comprising a layer of optical fiber cladding etchant suspended between two non-etching liquid layers.

* * * * *

UNITED STATES PATENT AND TRADEMARK OFFICE
CERTIFICATE OF CORRECTION

PATENT NO. : 6,303,041 B1 Page 1 of 1
DATED : October 16, 2001
INVENTOR(S) : Laming et al.

It is certified that error appears in the above-identified patent and that said Letters Patent is hereby corrected as shown below:

<u>Title page,</u>
Item [75], Inventors, should read -- Richard Ian Laming; Laurence Reekie, both of Southampton (GB); Laing Dong, Leatherhead (GB); Jose Luis Cruz, Valencia (ES) --.

Signed and Sealed this

Third Day of June, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,303,041 B1
DATED        : October 16, 2001
INVENTOR(S)  : Laming et al.

It is certified that error appears in the above-identified patent and that said Letters Patent is hereby corrected as shown below:

<u>Title page,</u>
Item [57], ABSTRACT, delete the ABSTRACT in its entirety and add:

-- A method of manufacturing a chirped optical fibre grating including the steps of:
etching the cladding of the optical fibre to vary the cross-sectional area of a portion of an optical fibre; and impressing a grating of uniform pitch on the portion of the fibre; in which the portion of the fibre is subjected to different respective longitudinal forces during the impressing step and during subsequent use of the grating. --

Signed and Sealed this

Thirteenth Day of January, 2004

JON W. DUDAS
*Acting Director of the United States Patent and Trademark Office*